United States Patent
Hsieh et al.

(10) Patent No.: US 7,592,852 B2
(45) Date of Patent: Sep. 22, 2009

(54) METHODS FOR CONTROLLING DRIVING CIRCUITS

(75) Inventors: Tsung-Jung Hsieh, Taoyuan Hsien (TW); Venson Kuo, Taoyuan Hsien (TW); Yueh-Lung Huang, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 29 days.

(21) Appl. No.: 11/087,859

(22) Filed: Mar. 24, 2005

(65) Prior Publication Data

US 2006/0028261 A1   Feb. 9, 2006

(30) Foreign Application Priority Data

Aug. 4, 2004   (TW) ............................ 93123326 A

(51) Int. Cl.
*H03K 17/56* (2006.01)
(52) U.S. Cl. .................................... 327/423; 327/588
(58) Field of Classification Search ................ 327/423, 327/424, 587, 588
See application file for complete search history.

(56) References Cited

U.S. PATENT DOCUMENTS

| | | | |
|---|---|---|---|
| 4,950,919 A * | 8/1990 | Rossi et al. ................. 327/401 |
| 5,952,856 A * | 9/1999 | Horiguchi et al. ........... 327/110 |
| 6,144,235 A * | 11/2000 | Marano et al. .............. 327/110 |
| 6,678,177 B2 * | 1/2004 | Asano et al. ................. 363/98 |
| 2003/0160640 A1 * | 8/2003 | Takeuchi et al. ............ 327/110 |
| 2004/0070354 A1 * | 4/2004 | Krueger ...................... 318/254 |
| 2005/0029973 A1 * | 2/2005 | Uno et al. ................... 318/254 |
| 2005/0040880 A1 * | 2/2005 | Plojhar et al. ............... 327/423 |
| 2005/0065901 A1 * | 3/2005 | Diong ......................... 706/25 |

FOREIGN PATENT DOCUMENTS

TW   483633   4/2002

\* cited by examiner

*Primary Examiner*—Lincoln Donovan
*Assistant Examiner*—Khareem E Almo
(74) *Attorney, Agent, or Firm*—Birch, Stewart, Kolasch & Birch, LLP

(57) ABSTRACT

A method for controlling a driving circuit. A first switch unit comprises a first switch and a second switch and a second switch unit comprises a third switch and a fourth switch. The first and second switch units are alternately turned on, and each switch is coupled to a blocking element in parallel. The first and second switches of the first switch unit are turned on simultaneously, and the first switch is then turned off. The second switch is turned off when the third and fourth switches are simultaneously turned on.

15 Claims, 6 Drawing Sheets

METHODS FOR CONTROLLING DRIVING CIRCUITS

BACKGROUND

The invention relates to driving circuits, and in particular to methods for controlling driving circuits by switching.

FIG. 1 shows a conventional H-bridge driving circuit. FIG. 2 is waveform diagram of signals input to the conventional H-bridge driving circuit in FIG. 1. Referring to FIGS. 1 and 2, the H-bridge driving circuit has a driving unit having transistors Q1 and Q2 and an inverse driving unit having transistors Q3 and Q4. A pulse width modulation (PWM) signal generating unit (not shown in FIG. 1) generates signals S21 to S24 as shown in FIG. 2. The signals S21 and S24 turn on the driving unit, and the signals S22 and S23 turn off the inverse driving unit, so that a current I flows through an induction coil L according to the solid line in FIG. 1. The signals S22 and S23 are then changed to turn on the inverse driving unit, and the signals S21 and S24 are changed to turn off the driving unit, so that a current I flows through the induction coil L according to the dashed line in FIG. 1. An external motor rotor (not shown in FIG. 1) is thus drive continuously. As shown in FIG. 2, there is a time difference ΔT between the falling edges of the pulses on the signals S21 and S24 and the rising edges of the pulses on the signals S22 and S23.

Referring to FIG. 3, when the phases of the pulses on the signals S21 and S24 fall, the H-bridge driving circuit simultaneously generates a large induction current I' to a capacitor C according to the solid line in FIG. 3, serving as a ripple current. The ripple current can generate high temperature, resulting in shortened lifetime of the capacitor C, especially for an electrolysis capacitor especially.

SUMMARY

Methods for controlling driving circuits are provided. An exemplary embodiment of a driving circuit comprises a first switch unit comprising first and second switches and a second switch unit comprising third and fourth switches. An exemplary embodiment of a method for controlling the driving circuit comprises turning on first and second switches of the first switch unit simultaneously. The first switch is turned off, and the second switch is turned off as the third and fourth switches are simultaneously turned on.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
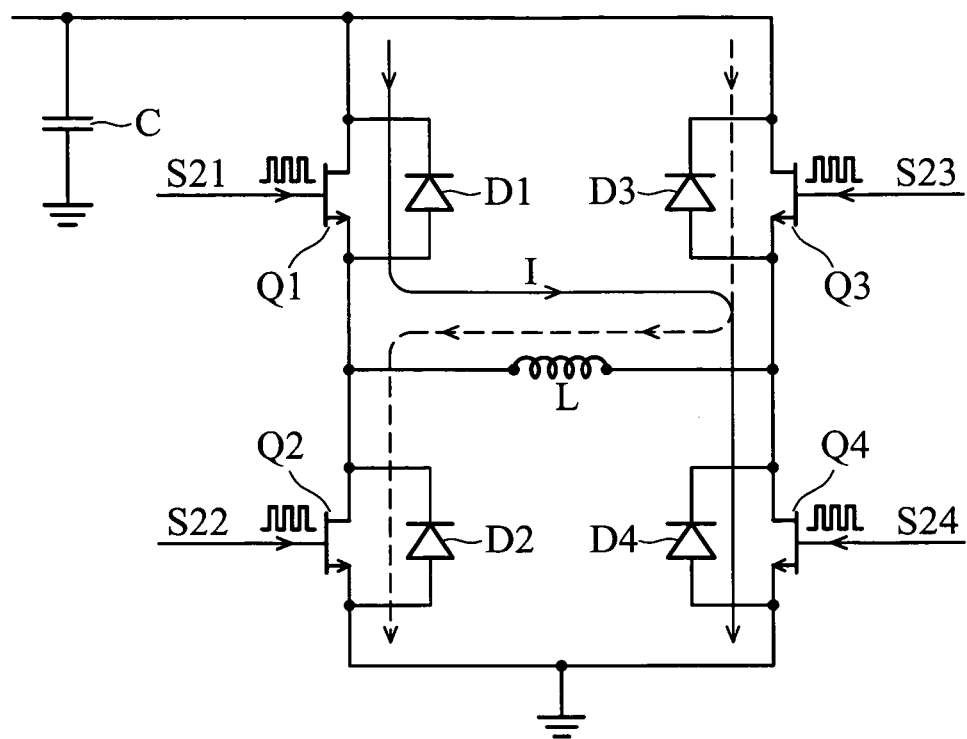
FIG. 1 shows a conventional H-bridge driving circuit.
Figure 2:
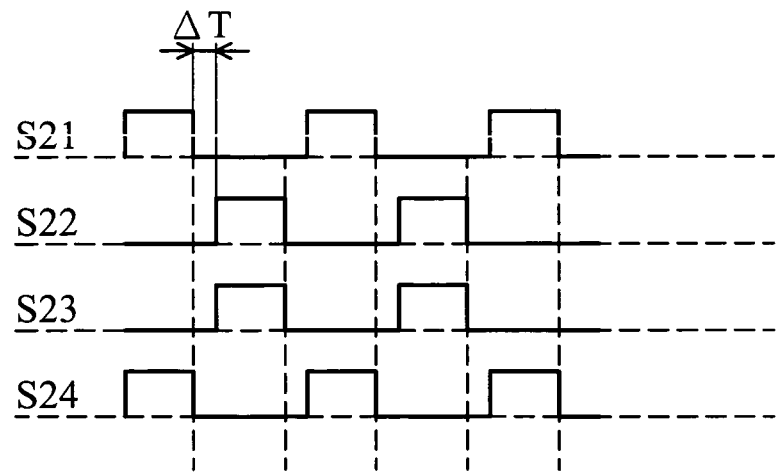
FIG. 2 is a waveform diagram of signals input to the conventional H-bridge driving circuit in FIG. 1.
Figure 3:
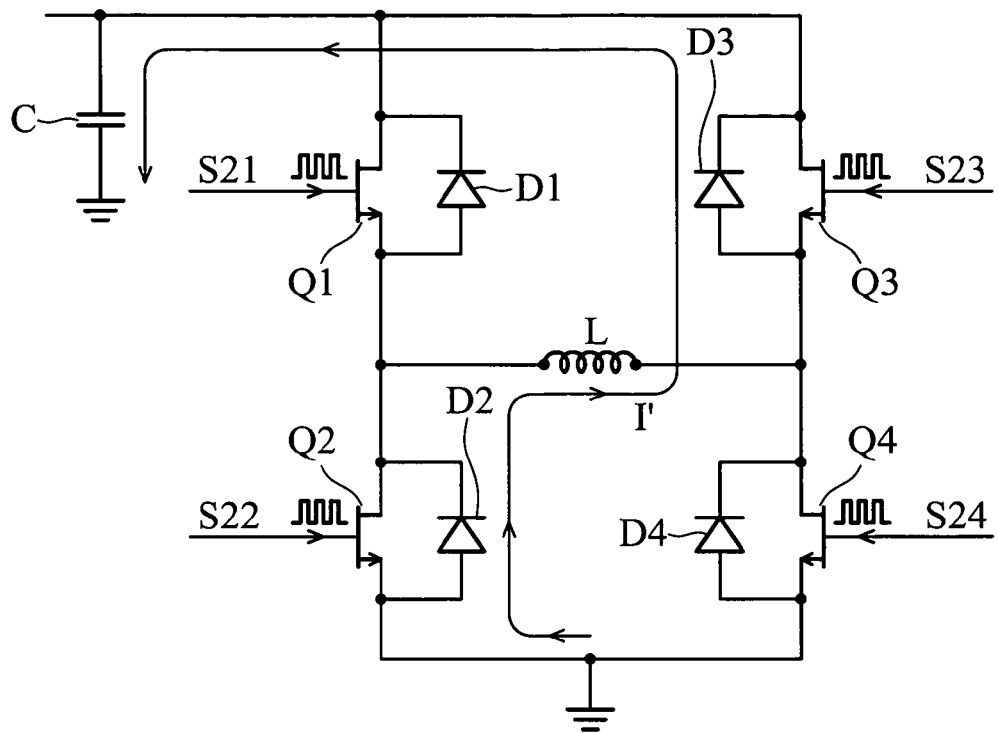
FIG. 3 shows the path of an induction current of the conventional H-bridge driving circuit in FIG. 2.
Figure 4:
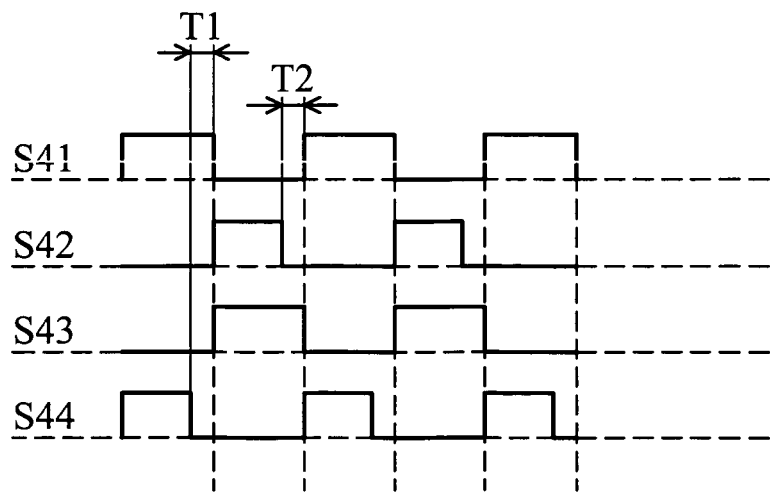
FIG. 4 shows an embodiment of a method for controlling of a driving circuit.
Figure 5:
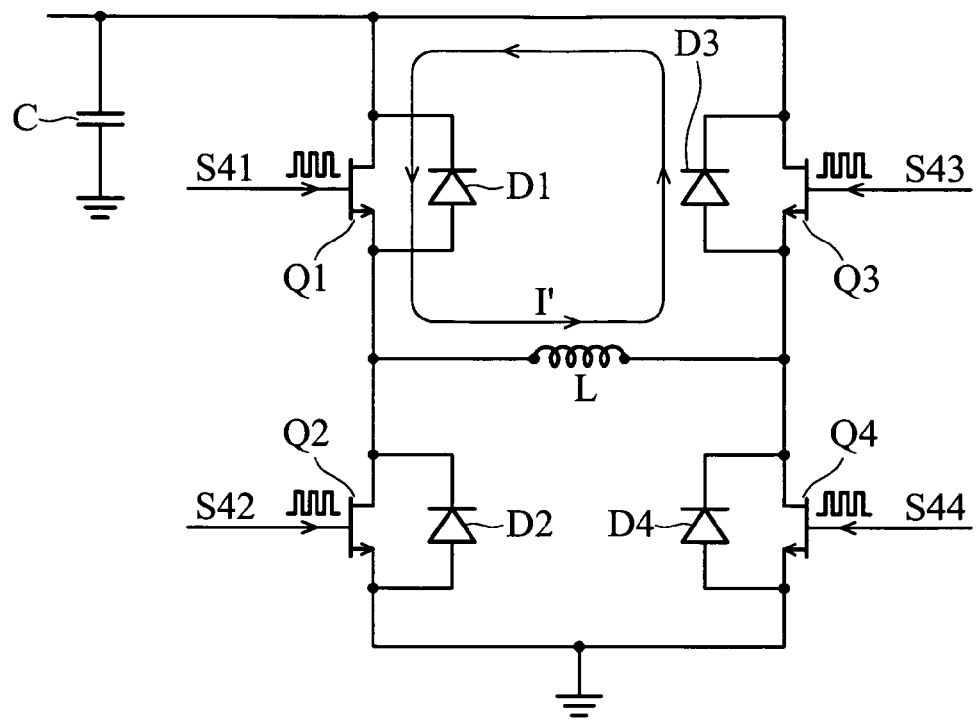
FIGS. 5 and 6 show a path of an induction current of the embodiment in FIG. 4.
Figure 6:
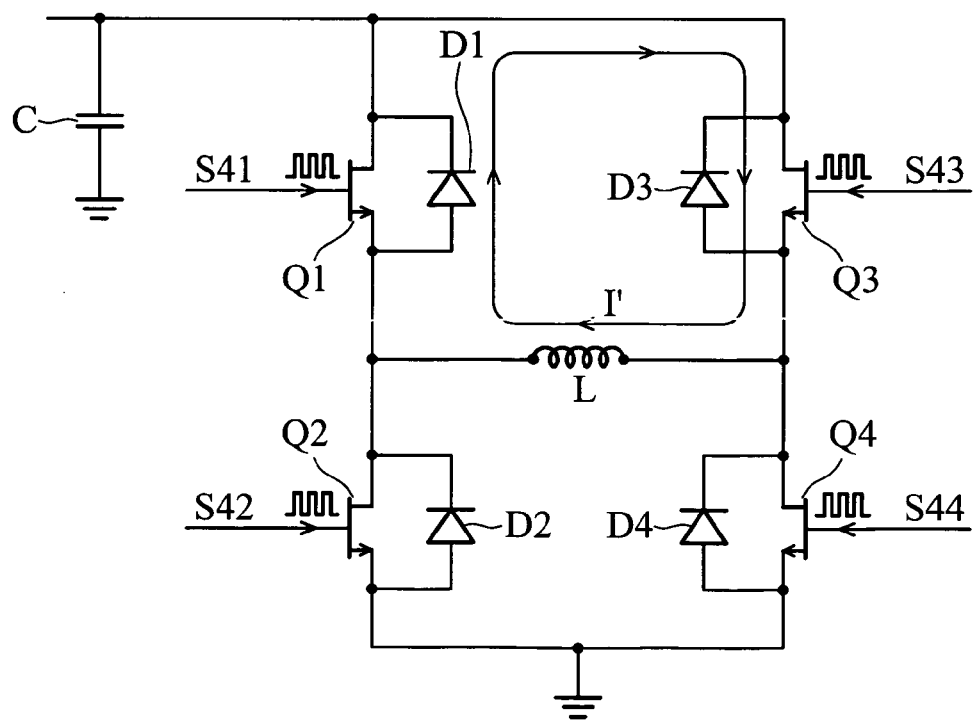

Methods for controlling driving circuits are provided. In an exemplary embodiment, as shown in FIG. 4, four PWM plus signals S41 to S44 are provided. Referring to FIGS. 4 to 6, the signals S41 to S44 are respectively transmitted to four switches, such as transistors Q1 to Q4 of an H-bridge driving circuit. In the H-bridge driving circuit, a first switch unit comprises the transistors Q1 and Q4, and a second switch unit comprises the transistors Q2 and Q3. Transistors Q1 to Q4 are respectively coupled to blocking elements, diodes D1 to Q4 in FIG. 5, in parallel. When the signals S41 and S44 enter to a turn-on mode to respectively turn on the transistors Q1 and Q4, the signals S42 and S43 are in a turn-off mode to respectively turn off the transistors Q2 and Q3. Subsequently, the signal S44 switches to the turn-off mode. The signal S41 is delayed by a interval T1 and switches to the turn-off mode after the signal S44 switches to the turn-off mode, and signals S42 and S43 switch to the turn-on mode simultaneously when the signal S41 switches.

According to the signals S41 to S44 of FIG. 4, during the interval T1, the transistor Q4 of the first switch unit is turned off, the transistor Q1 thereof is turned on, and the transistors Q2 and Q3 of the second switch unit are turned off. An induction current I' thus flows through the transistor Q1, an induction coil L, and the diode D3 and then back to the transistor Q1 to form a current loop indicated by the solid line in FIG. 5. Thus, the induction current I' cannot reach the capacitor C for charge/discharge, resulting in a decreased ripple current.

The transistor Q1 is turned off by the signal S41 when the transistors Q2 and Q3 of the second switch are simultaneously turned on by the signals S42 and S43. A current flows through the transistors Q2 and Q3. According to the signals S41 to S44 of FIG. 4, the signal S42 switches to the turn-off mode subsequently. The signal S43 is delayed a interval T2 of time and switches to the turn-off after the signal S42 switches to the turn-off mode, and signals S41 and S44 switch to the turn-on mode simultaneously when the signal S43 switches. During the interval T2, the transistor Q2 is turned off, the transistor Q3 is turned on, and the transistors Q1 and Q4 of the first switch unit are turned off. An induction current I' thus flows through the transistor Q3, the induction coil L, and the diode D1 and then back to the transistor Q3 to form a current loop indicated by solid line in FIG. 6. Thus, the induction current I' cannot reach the capacitor C for charge/discharge, resulting in a decreased ripple current.

As described, the two switch units in the H-bridge driving circuit are alternately turned on. In the turned on switch unit of the H-bridge driving circuit, one transistor is turned off, with the other turned off subsequently. The path of the induction current I' forms a current loop, and the induction current I' cannot reach the capacitor C.

The switches within the switch units can be transistors, relays, and so on according to requirements, without limitation.

Figure 7:
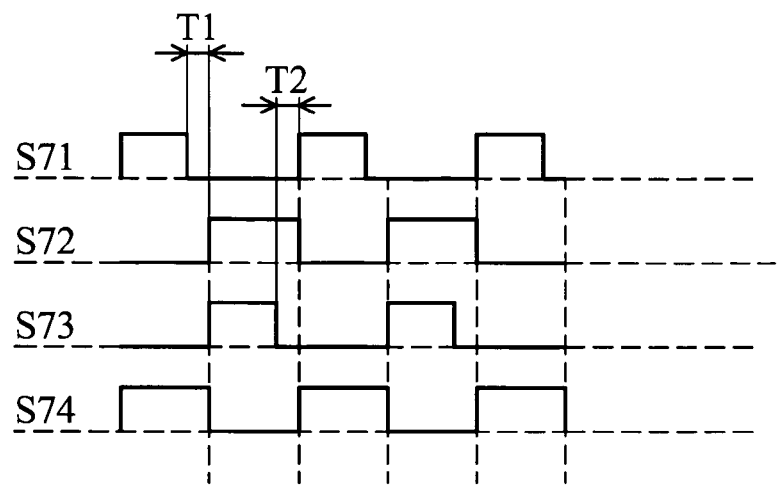
FIG. 7 shows an embodiment of an improving method.
Figure 8:
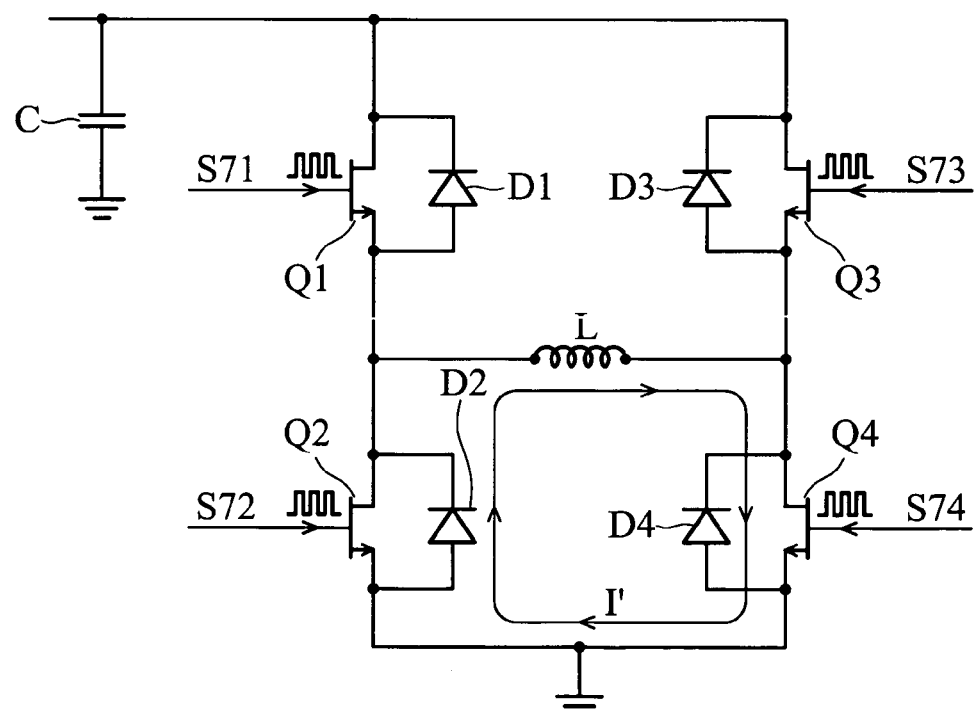
FIGS. 8 and 9 show a path of an induction current of the embodiment in FIG. 7.
Figure 9:
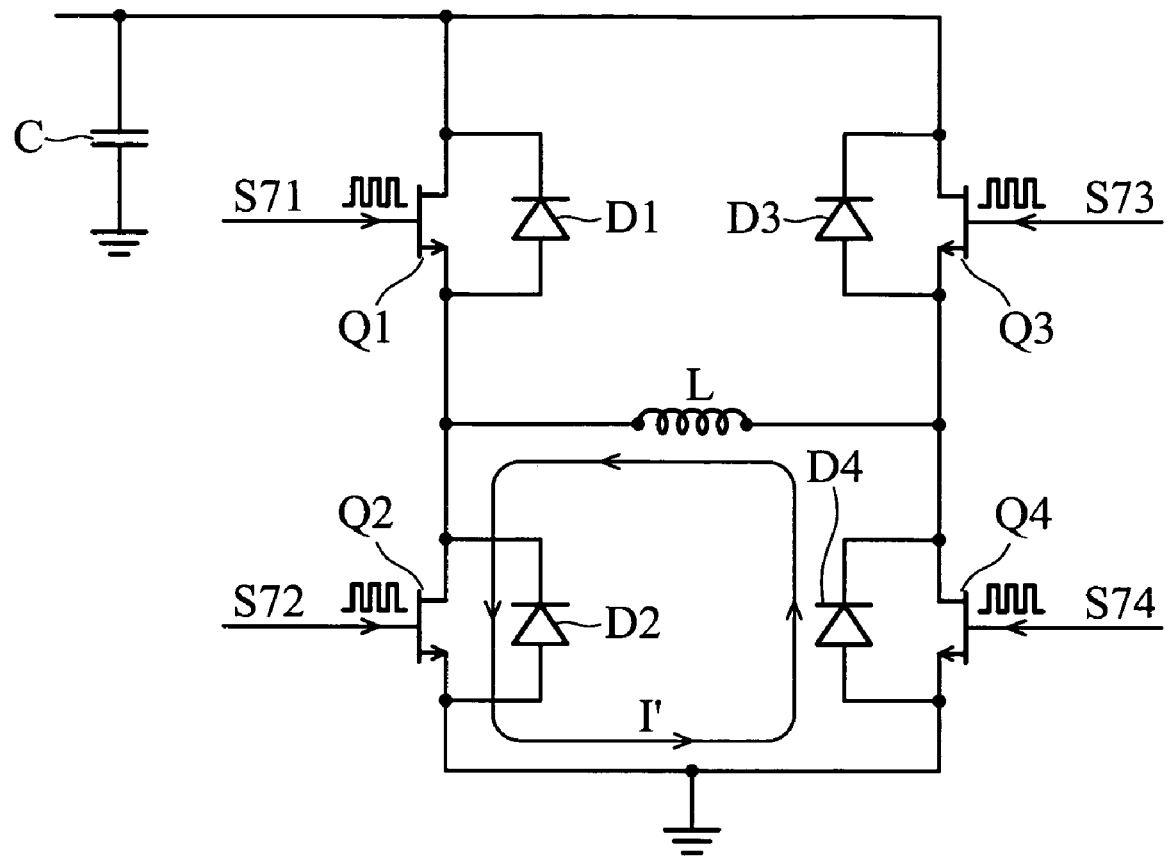

As shown in FIG. 7, four PWM plus signals S71 to S74 are provided. Referring to FIGS. 7 to 9, the signals S71 to S74 are respectively transmitted to transistors Q1 to Q4 of an H-bridge driving circuit.

When the signals S71 and S74 enter a turn-on mode to respectively turn on the transistors Q1 and Q4, the signals S72 and S73 are in a turn-off mode to respectively turn off the transistors Q2 and Q3. Subsequently, the signal S71 switches to the turn-off period. The signal S74 is delayed a interval T1 of time and switches to the turn-off mode after the signal S71 switches to the turn-off mode, and signals S72 and S73 switch to the turn-on mode simultaneously when the signal S74 switches. According to the signals S71 to S74 of FIG. 7, during the interval T1, the transistor Q1 of the first switch unit is turned off, the transistor Q4 thereof is turned on, and the transistors Q2 and Q3 of the second switch unit are turned off. An induction current I' flows through the transistor Q4, the diode D2, and an induction coil L and then back to the transistor Q4 to form a current loop indicated by the solid line in FIG. 8. Thus, the induction current I' cannot reach the capacitor C for charge/discharge, resulting in a decreased ripple current.

According to the signals S71 to S74 of FIG. 7, the signal S73 switches to the turn-off period subsequently. The signal S72 is delayed a interval T2 and switches to the turn-off mode after the signal S73 switches to the turn-off mode, and signals S71 and S74 switch to the turn-on mode simultaneously when the signal S72 switches. During the interval T2, when the transistor Q3 is turned off, the transistor Q2 is turned on, and the transistors Q1 and Q4 of the first switch unit are turned off. An induction current I' flows through the transistor Q2, the diode D4, and the induction coil L and then back to the transistor Q2 to form a current loop indicated by the solid line in FIG. 9. Thus, the induction current I' cannot reach the capacitor C for charge/discharge, resulting in a decreased ripple current.

Figure 10:
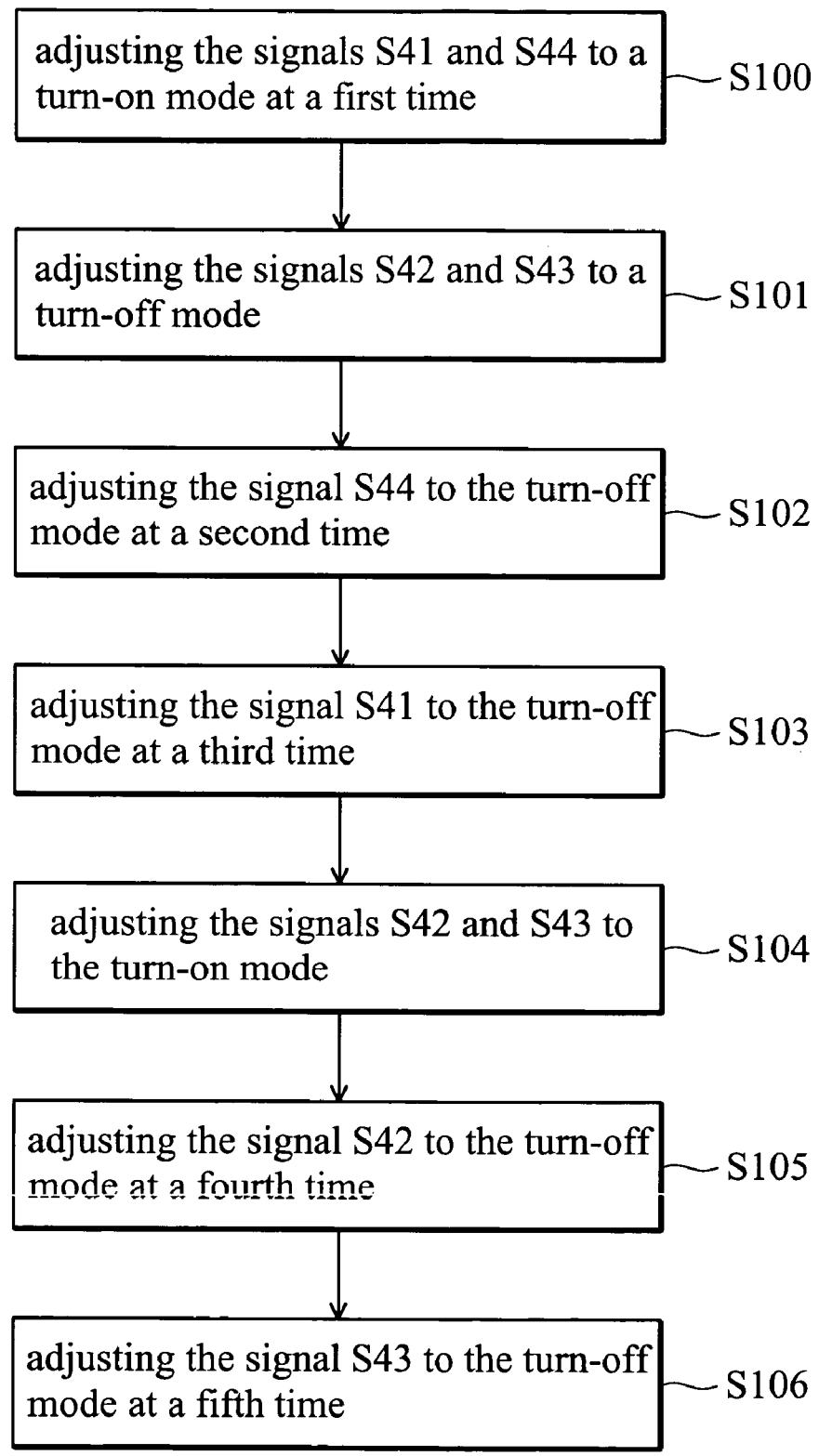
FIG. 10 is a flow chart of an embodiment of a method for an H-bridge driving circuit.

FIG. 10 is a flow chart of an embodiment of a method for controlling an H-bridge driving circuit. Referring to FIGS. 4, 5, 6, and 10, the signals S41 and S44 switch to a turn-on mode to respectively turn on the transistors Q1 and Q4 at a first point (step S100), and the signals S42 and S43 switch to a turn-off mode to respectively turn off the transistors Q2 and Q3 (step S101). The signal S44 then switches to the turn-off mode at a second time (step S102), and the signal S41 switches to the turn-off mode at a third time later than the second time (step S103). The signals S42 and S43 simultaneously switch to the turn-on mode (step S104). The signal S42 switches to the turn-off mode at a fourth time (step S105), and the signal S43 switches to the turn-off mode a fifth time later than the fourth time (S106). At the fifth time, the signals S41 and S44 switch to a turn-on period simultaneously.

Accordingly, one switch unit in the H-bridge driving circuit is selected to be turned on. In the turned on switch unit, one transistor is turned off, and the other transistor is turned off later. There is no limitation of which transistor in the turned on switch unit is turned on first.

While the invention has been described by way of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling a driving circuit comprising steps of:

providing a driving circuit and a capacitor electrically connected to the driving circuit, wherein the driving circuit drives a single phase motor and comprises a first switch unit and a second switch unit, the first switch unit comprises a first switch and a second switch, the second switch unit comprises a third switch and a fourth switch, the first and second switch units are alternately turned on, and each switch is coupled to a blocking element in parallel;

turning on the first and second switches of the first switch unit simultaneously;

turning off the first switch while the second switch is still turned on at a first time point so that the an induction current generated in the driving circuit cannot reach the capacitor for charge or discharge, resulting in a described ripple current; and simultaneously turning off the second switch and turning on the third and fourth switches at a second time point, wherein the first time point and the second time point are different, and the first time point is before the second time point.

2. The method as claimed in claim 1, wherein the driving circuit is an H-bridge driving circuit.

3. The method as claimed in claim 1, wherein the switches are transistors.

4. The method as claimed in claim 1, wherein the switches are relays.

5. The method as claimed in claim 1, wherein the blocking element is a diode.

6. A method for controlling a driving circuit comprising steps of:

providing a driving circuit, wherein the driving circuit drives a single phase motor and comprises a first switch unit and a second switch unit, each of the first and second switch units comprises two switches; and the first and second switch units are alternately turned on by four signals provided to the switches;

simultaneously adjusting the first and second signals to a turn-on mode and the third and fourth signals to a turn-off mode at a first time point, wherein the first and second signals are provided to the first switch unit and the third and fourth signals are provided to the second switch unit;

adjusting the second signal to the turn-off mode at a second time point;

adjusting the first signal to the turn-off mode and simultaneously adjusting the third and fourth signals to a turn-on mode at a third time point;

adjusting the third signal to the turn-off mode at a fourth time point; and adjusting the fourth signal to the turn-off mode and simultaneously adjusting the first and second signals to the turn-on mode at a fifth time point, wherein the first time point, the second time point, the third time point, the fourth time point, and the fifth time point occur in sequence.

7. The method as claimed in claim 6, wherein the driving circuit is an H-bridge driving circuit.

8. The method as claimed in claim 6, wherein the switches are transistors.

9. The method as claimed in claim 6, wherein the switches are relays.

10. The method as claimed in claim 6, wherein each of the switches of the first and second switch units is electrically connected with a blocking element in parallel.

11. The method as claimed in claim 10, wherein the blocking element is a diode.

12. A method for controlling a driving circuit comprising steps of:

providing a driving circuit, wherein the driving circuit drives a single phase motor and comprises a first switch unit and a second switch unit, the first switch unit comprises a first switch and a second switch, the second switch unit comprises a third switch and a fourth switch, the first and second switch units are alternately turned on, and each switch is coupled to a blocking element in parallel;

turning on the first and second switches of the first switch unit simultaneously at a time point;

continuing turning on the first until a first time point;

continuing turning on the second switch until a second time point, wherein the first time point is between the time point and the second time point;

turning off the first switch at the first time point;

continuing turning off the first switch from the first time point to the second time point; and simultaneously turning off the second switch and turning on the third and fourth switches at the second time point.

13. The method as claimed in claim 12, wherein the driving circuit is an H-bridge driving circuit.

14. The method as claimed in claim 12, wherein the switches are transistors or relays.

15. The method as claimed in claim 12, wherein the blocking element is a diode.

* * * * *